(12) United States Patent
Carty et al.

(10) Patent No.: US 10,659,607 B2
(45) Date of Patent: *May 19, 2020

(54) REAL-TIME SPEECH FEED TO AGENT GREETING

(71) Applicant: Avaya Inc., Santa Clara, CA (US)

(72) Inventors: Gerard Carty, Kilcolgan (IE); Thomas Moran, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/419,554

(22) Filed: May 22, 2019

(65) Prior Publication Data

US 2019/0273821 A1 Sep. 5, 2019

Related U.S. Application Data

(63) Continuation of application No. 15/599,537, filed on May 19, 2017, now Pat. No. 10,389,879.

(51) Int. Cl.
*H04M 3/493* (2006.01)
*H04M 3/58* (2006.01)
(Continued)

(52) U.S. Cl.
CPC ...... *H04M 3/4936* (2013.01); *G06F 17/2705* (2013.01); *G06F 17/2735* (2013.01);
(Continued)

(58) Field of Classification Search
CPC ............ G06F 17/2705; G06F 17/2735; H04M 3/4936; H04M 3/5133; H04M 3/58;
(Continued)

(56) References Cited

U.S. PATENT DOCUMENTS 10,389,879 B2 * 8/2019 Carty
2002/0169606 A1 11/2002 Bantz et al.
(Continued)

FOREIGN PATENT DOCUMENTS

GB 2476781 A 7/2011
JP 2005072936 A 3/2005
(Continued)

OTHER PUBLICATIONS

Niapierski, Jason; "Getting Started with Real-Time Speech Analytics" ; Santander Consumer; CallMiner; Jan. 2014.
(Continued)

*Primary Examiner* — Harry S Hong
(74) *Attorney, Agent, or Firm* — Stevens & Showalter LLP (57) ABSTRACT

A process for updating a second agent about a call in a contact center comprises receiving a call at the contact center and connecting the call to a device associated with a first agent of the contact center. A processor is used to configure a list of keywords to detect during the call, and when a key word is detected (e.g., using a speech analyzer), a snippet of the call based on the detected keywords is identified. The snippets are presented to a second agent through a device associated with the second agent. The call is then connected to the device associated with the second agent.

20 Claims, 6 Drawing Sheets

(51) Int. Cl.
*G06F 17/27* (2006.01)
*H04M 3/51* (2006.01)

(52) U.S. Cl.
CPC .......... *H04M 3/5133* (2013.01); *H04M 3/58* (2013.01); *H04M 2201/40* (2013.01); *H04M 2203/2038* (2013.01); *H04M 2203/552* (2013.01)

(58) Field of Classification Search
CPC ..... H04M 2201/40; H04M 2203/2038; H04M 2203/552
USPC .................................................... 379/265.07
See application file for complete search history.

(56) References Cited

U.S. PATENT DOCUMENTS

| | | |
|---|---|---|
| 2011/0302162 A1 | 12/2011 | Xiao et al. |
| 2015/0286627 A1 | 10/2015 | Chang et al. |
| 2015/0347973 A1 | 12/2015 | Singh et al. |
| 2015/0350430 A1 | 12/2015 | Nowak et al. |
| 2016/0098479 A1 | 4/2016 | Anwar et al. |
| 2016/0171100 A1 | 6/2016 | Fujita et al. |
| 2016/0330145 A1 | 11/2016 | Patel et al. |
| 2017/0300563 A1 | 10/2017 | Kao et al. |
| 2018/0150562 A1 | 5/2018 | Gundimeda et al. |
| 2018/0338040 A1 | 11/2018 | Carty et al. |

FOREIGN PATENT DOCUMENTS

| | | |
|---|---|---|
| JP | 2006185319 A | 7/2006 |
| JP | 2007212532 A | 8/2007 |
| JP | 2008123447 A | 5/2008 |
| JP | 2015141428 A | 8/2015 |
| JP | 2015156062 A | 8/2015 |
| JP | 2016092582 A | 5/2016 |
| JP | 2016170248 A | 9/2016 |
| JP | 2018182475 A | 11/2018 |
| KR | 1020110080900 A | 7/2011 |
| KR | 101063261 B1 | 9/2011 |
| KR | 1020150141279 A | 12/2015 |
| WO | 2004023772 A1 | 3/2004 |
| WO | 2010043564 A1 | 4/2010 |
| WO | 2015037073 A1 | 3/2015 |

OTHER PUBLICATIONS

Hong, Harry S.; Office Action; U.S. Appl. No. 15/599,537, dated Jun. 14, 2018; Alexandria, VA.

Hong, Harry S.; Notice of Allowance; U.S. Appl. No. 15/599,537, dated Jan. 10, 2019; Alexandria, VA.

Japanese Search Report; Japanese Patent Application No. 2018095822, dated Apr. 26, 2019; Japan Patent Office; Tokyo, Japan.

Japanese Decision on Appeal; Japanese Patent Application No. 2018095822, dated May 14, 2019; Japan Patent Office; Tokyo, Japan.

Lewney, Mark; Combined Search and Examination Report; UK Patent Application No. GB1808102.6; Intellectual Property Office; United Kingdom.

Hong, Harry S.; Notice of Allowance; U.S. Appl. No. 15/599,537, dated Apr. 3, 2019; Alexandria, VA.

Yeong-Hoe Gu; Notice of Preliminary Rejection; Korean Application No. 10-2018-0056340, dated Nov. 15, 2019; Korean Intellectual Property Office; Daejeon, Republic of Korea.

\* cited by examiner

REAL-TIME SPEECH FEED TO AGENT GREETING

CROSS REFERENCE TO RELATED APPLICATIONS

This application is a continuation of U.S. patent application Ser. No. 15/599,537, filed May 19, 2017, by Gerard Carty et al., entitled "REAL-TIME SPEECH FEED TO AGENT GREETING", now allowed, the disclosure of which is hereby incorporated by reference.

BACKGROUND

Various aspects of the present invention relate to the technological field of optimizing throughput at a contact center.

Contact centers are employed by many enterprises to service inbound and outbound telephonic calls, e-mails, chats, other communications, etc. from contacts (i.e., customers). A typical contact center includes a switch and/or server to receive and route incoming packet-switched and/or circuit-switched requests and one or more resources, such as human agents and automated resources (e.g., Interactive Voice Response (IVR) units), to service the incoming requests. Contact centers distribute calls, whether inbound or outbound, for servicing to any suitable resource according to certain predefined criteria.

BRIEF SUMMARY

According to aspects of the present invention, a process for updating a second agent about a call in a contact center comprises receiving a call at the contact center and connecting the call to a device associated with a first agent of the contact center. A processor is used to configure a list of keywords to detect during the call, and when a key word is detected (e.g., using a speech analyzer), a snippet of the call based on the detected keywords is identified. The snippets are presented to a second agent through a device associated with the second agent. The call is then connected to the device associated with the second agent.

DETAILED DESCRIPTION

According to various aspects of the present disclosure, a first agent of a contact center may wish to transfer a call to a second agent of the contact center for various reasons (e.g., the first agent cannot help the customer, the customer is getting upset, etc.). However, the customer (i.e., contact) may get frustrated (or even more so) if he needs to repeat himself to the second agent before the second agent is able to help him. As such, processes disclosed herein improve computer technology in a manner that has not been done before to get the second agent up to speed on the call in a short period of time before the customer is connected to the second agent.

Basically, a call is monitored for occurrences of keywords that are stored in a static or dynamic list to identify snippets of the call that may help the second agent understand what the call is about and why the call is being transferred. The snippets are then ordered and played to the second agent before the call is connected to a computing device of the second agent. These ordered snippets act similarly to a movie trailer in that the second agent may get a gist of the call without having to listen to the entire call or read an entire transcript of the call. Moreover, the second agent gains better access to what exactly was happening on the call, because the second agent can hear the tone, emotion, impatience, etc. of the customer, agent, or both. Further, the audio playback of snippets is probably easier to digest in a short period of time over a transcript alone.

Figure 1:
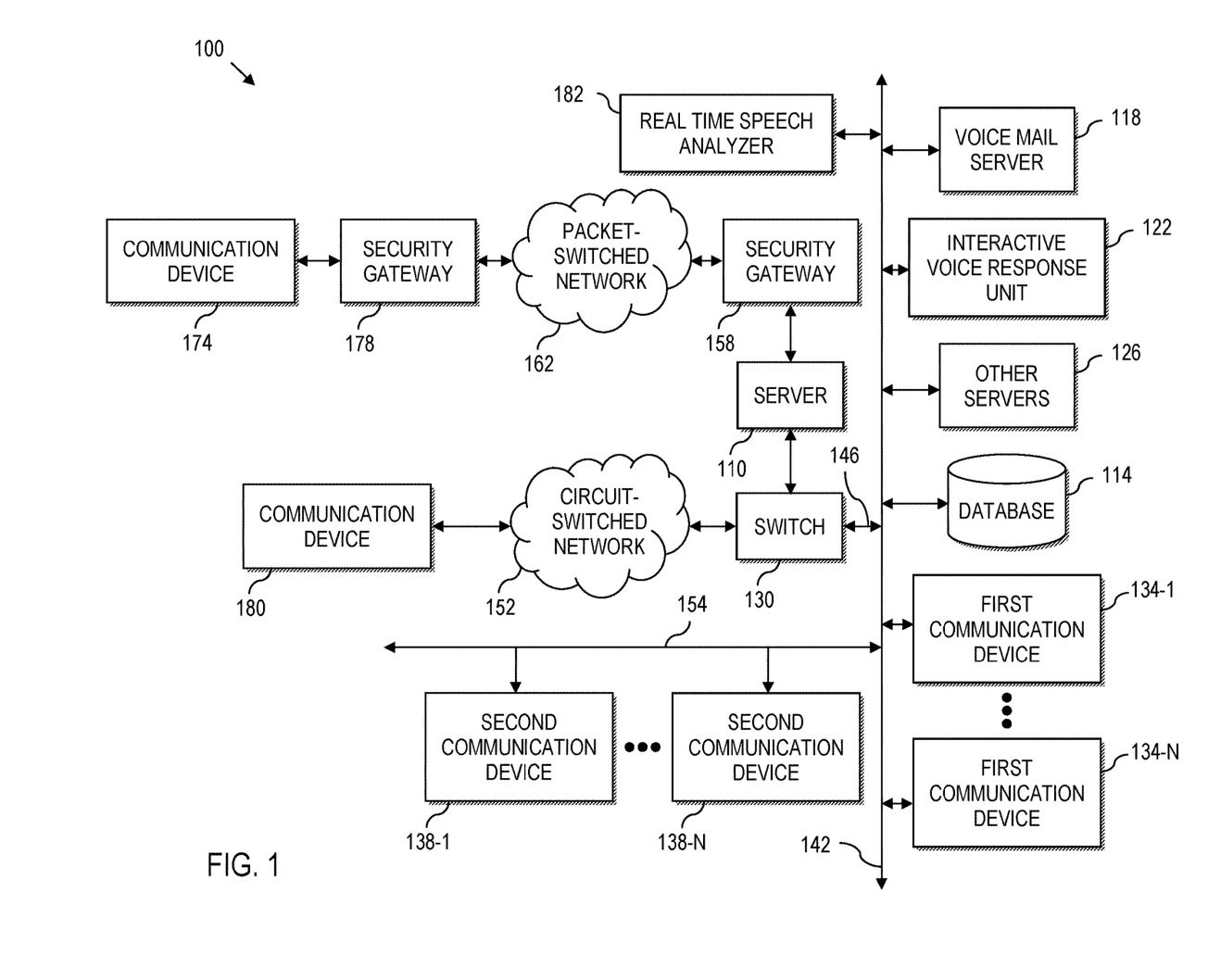
FIG. 1 is a block diagram illustrating a contact center, according to various aspects of the present disclosure.

Referring to the drawings, FIG. 1 shows a block diagram of a contact center 100 that comprises a server 110; a set of data stores or database 114 containing contact or customer related information and other information that may enhance the value and efficiency of the contact processing; a plurality of servers (e.g., a voice mail server 118, an Interactive Voice Response unit (e.g., IVR) 122, and other servers 126); a switch 130; a plurality of working agents operating packet-switched (first) communication devices 134-1-N (such as computer work stations or personal computers); and/or circuit-switched (second) communication devices 138-1-M, which are interconnected by a Local Area Network (LAN) 142, or Wide Area Network (WAN). The servers may be connected via optional communication lines 146 to the switch 130. As will be appreciated, the other servers 126 may also include a scanner (which is normally not connected to the switch 130 or a Web Server), VoIP software, video call software, voice messaging software, an IP voice server, a fax server, a web server, an email server, and the like. The switch 130 is connected via a plurality of trunks to a circuit-switched network 152 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. Further, the security gateway 158 may be implemented as hardware such as via an adjunct processor (as shown) or as a chip in the server.

Although systems herein are discussed with reference to client-server architecture, it is to be understood that the principles of the present invention apply to other network architectures. For example, aspects of the present disclosure may apply to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, packet- or circuit-switched networks are not required.

The switch 130 and/or server 110 may be any architecture for directing contacts to one or more communication devices. In some embodiments, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ PrivateBranch Exchange (PBX)-based ACD system, MultiVantage™ PBX, Communication Manager™, S8300™ media server and any other media servers, SIP Enabled Services™ Intelligent Presence Server™, and/or Avaya Interaction Center™, and any other products or solutions offered by Avaya or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™ IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched. Each of the communication devices 138-1-M corresponds to one of a set of internal extensions Ext1-M, respectively. The second communication devices 138-1-M may include, for example, wired and wireless telephones, PDAs, H.320 videophones and conferencing units, voice messaging and response units, traditional computer telephony adjuncts, and any other communication device.

It should be noted that the invention does not require any particular type of information transport medium between switch, server, or first and second communication devices (i.e., the invention may be implemented with any desired type of transport medium as well as combinations of different types of transport channels).

The packet-switched network 162 can be any data and/or distributed processing network, such as the Internet. The packet-switched network 162 typically includes proxies (not shown), registrars (not shown), and routers (not shown) for managing packet flows.

The packet-switched network 162 as shown in FIG. 1 is in communication with a communication device 174 via a security gateway 178 and the circuit-switched network 152 with an external second communication device 180.

In a preferred configuration, the server 110, packet-switched network 162, and the first communication devices 134-1-N are Session Initiation Protocol (SIP) compatible and can include interfaces for various other protocols such as the Lightweight Directory Access Protocol (LDAP), H.248, H.323, Simple Mail Transfer Protocol (SMTP), IMAP4, ISDN, E1/T1, and analog line or trunk.

As will be appreciated, the server 110 is notified via the LAN 142 of an incoming contact by communications component (e.g., switch 130, fax server, email server, Web Server, and/or other servers) receiving the incoming contacts as shown in FIG. 1. The incoming contact is held by the receiving telecommunications component until the server 110 forwards instructions to the component to forward or route the contact to a specific contact center resource, such as the IVR unit 122, the voice mail server 118, and/or first or second communication device 134-1-N, 138-1-M associated with a selected agent. The server 110 distributes and connects these contacts to telecommunication devices of available agents based on the predetermined criteria noted above. When the server 110 forwards a contact to an agent, the server 110 also forwards customer-related information from the database 114 to the agent's computer work station for viewing (such as by a pop-up display) to permit the agent to better serve the customer of the contact center. Depending on the agent's profiles, their current working status, and parameters of the incoming contacts, the server 110 may assign a multichannel contact to the agents of the contact center. The agents process the incoming contacts sent to them by the server 110. This embodiment is particularly suited for a Customer Relationship Management (CRM) environment in which customers are permitted to use any media to contact an enterprise. In a CRM environment, both real-time and non-real-time contacts must be handled and distributed with equal efficiency and effectiveness. Further, a real-time speech analyzer 182 may analyze real-time (or near real-time) speech between contact and an agent over the communication devices.

Figure 2:
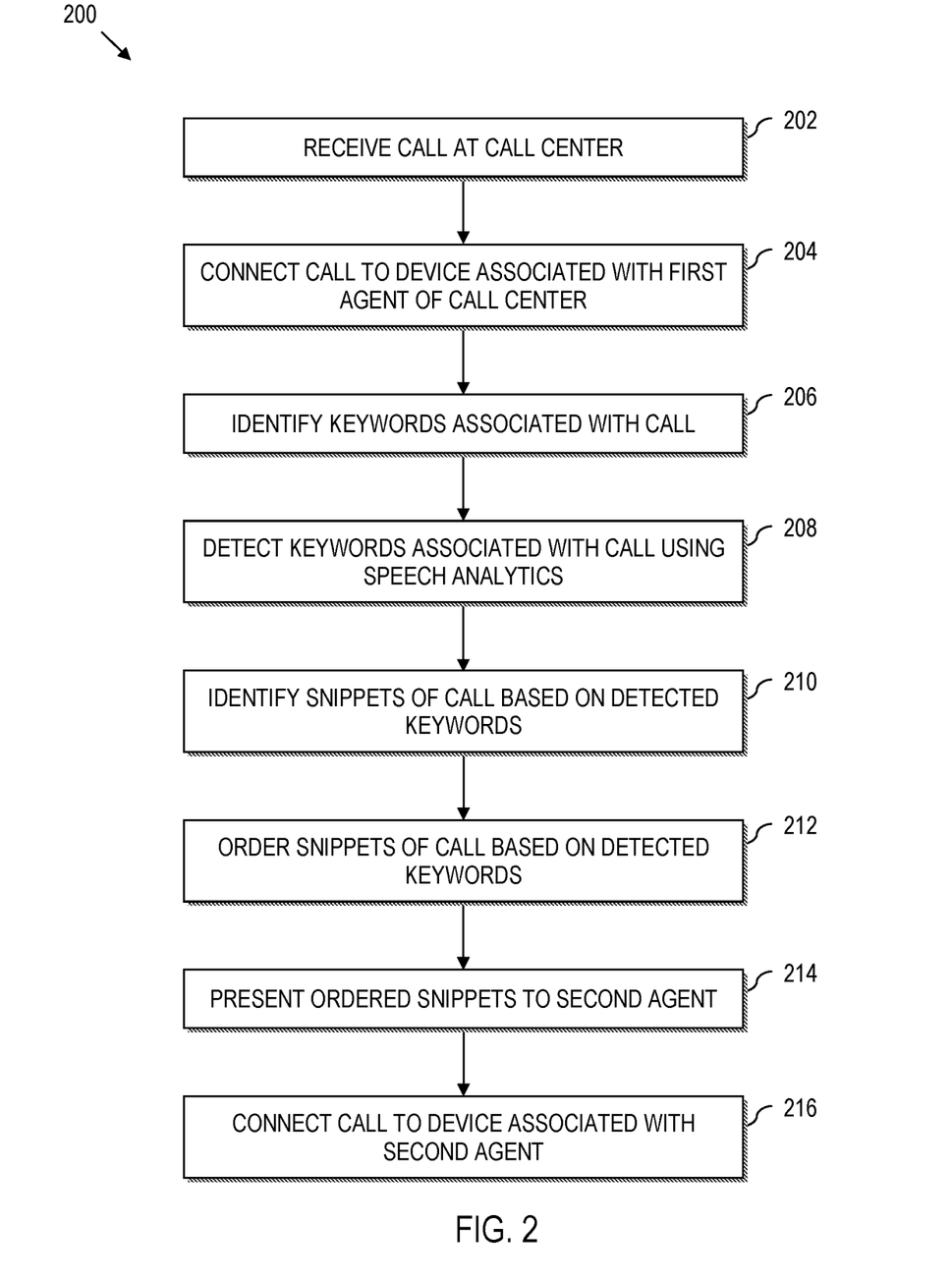
FIG. 2 is a flow chart illustrating a method for updating a second agent about a call in a contact center, according to various aspects of the present disclosure.

FIG. 2 illustrates a process 200 for updating a second agent about a call in a contact center. In this regard, the process 200 may be implemented on computer-readable hardware that stores machine-executable program code, where the program code instructs a processor to implement the described process. The process 200 may also be executed by a processor coupled to memory, where the processor is programmed by program code stored in the memory to perform the described process. As such, the process 200 may be executed on any of the servers described above in regard to FIG. 1 or on another device as desired.

At 202, a call (e.g., telephone call, video call, chat window, etc.) is received at a contact center. At 204, the call is connected to a device associated with a first agent of a contact center. For instance, when the call is received, there may be an indication of skills (e.g., tech support, sales, etc.) that are required by an agent to handle the call. For example, a contact associated with the call may go through an interactive voice response (IVR) system to indicate what skills are required. As another example, the contact may go through a touch-selection on a phone. In any case, if such an indication is received, then the call may be routed to a device (134-1-N, FIG. 1) associated with an agent that has the skills indicated (or at least a subset of the skills indicated), so the agent may handle the call. Further, the call is recorded for future playback.

At 206, keywords are identified for the call. The keywords may be kept in a list of keywords and are words to be detected during the call to identify snippets of the call for later playback. The list of keywords may be configured by identifying keywords that express that the contact is unhappy and adding those words to the list. As another example, if any skills are indicated as being important to the call, those skills may be configured as keywords. Still further, words that indicate that the agent is confused may be added to the list. In another example, words that indicate that the agent is going to transfer the call may be added to the list of keywords to be detected during the call to identify snippets of the call for later playback.

Further, the "keywords" are not limited to one word. For example, a single keyword may include a phrase (e.g., "bumper of my sedan" may be a single keyword).

Moreover, the "keywords" may not be words at all. For example, if the call includes a video element, then gestures may be added as keywords to the list of keywords. As another example, if the contact center has an emotion analyzer, then emotions that may be detected (e.g., anger, confusion, etc.) may be added to the list of keywords to be detected during the call to identify snippets of the call for later playback.

In any event, the list of keywords may also be configurable such that a manager of the contact center may enter any desired keyword to be detected on any call. Further, other keywords may be determined based on keywords that have already been identified (see FIG. 3 below). Thus, the list may have a static portion (i.e., keywords not associated with a specific call) and a dynamic portion (keywords associated with a specific call or a section of the call center).

At 208, speech analysis (and possibly gesture analysis and/or emotion analysis) is used to detect if any of the keywords from the list are present (i.e., stated) during the call. This detection is performed in real time or near real time (e.g., using speech analyzer 182 of FIG. 1), so the detection will be performed before the call would be transferred to a second agent. For example, in a call center with excess processing power on the servers or agent devices, the detection may be performed from the time that the call is connected to the first agent and throughout the call. However, in a contact center with limited processing power, the speech analysis may not occur until after the agent indicated that the call will be transferred to another agent (e.g., the agent may provide the indication through a graphical user interface (GUI), through a phone, etc.). In such an instance, when the indication that the call is to be transferred is received, the speech analyzer may analyze a recording of the call from the beginning of the call to detect the keywords.

At 210, if any keywords are detected in the call, then snippets of the call based on the detected keywords are identified. The snippets may be determined by a set number of words detected before, after, or both, the keyword is detected. For example, if the snippets are identified by ten words before and after the keyword is detected, then the snippet may be twenty one words: the ten words before, the keyword, and the ten words after. Alternatively, a snippet may be defined as the entire sentence that includes the keyword. Thus, if the speech analyzer can determine a start and an end to a sentence that includes a keyword, then the snippet may be the entire sentence. As another example, the snippets may be determined by a set time window before, after, or both, the keyword is detected.

At 212, the identified snippets are ordered in terms of relevant importance to a second agent. For example, if a keyword occurs near the first agent indicating that the call is to be transferred, then the snippet including that keyword may have more weight than other snippets. As another example, if the keyword includes a detection that the contact is getting angry, then the snippet including the keyword that indicated that the contact was first getting angry may hold more weight. In a further example, if a snippet includes more keywords than other snippets, then that snippet may be given more weight. Other criteria may be used to determine an order of the snippets (e.g., chronology, emotion, important keywords (e.g., "close my account", transfer rationale, etc.), and more than one criterion may be used to determine an order for the snippets.

At 214, the ordered snippets are presented to a second agent in the order determined above. For example, the ordered snippets may be presented to the second agent through a GUI such that the second agent may click on a snippet to play the recording of that snippet. An example GUI is described in greater detail below in reference to FIG. 5. In some embodiments, the snippets start playing in the order presented to the second agent without the second agent needing to click on the snippets or even without the snippets being presented through a GUI.

The presentation of the ordered snippets may be performed while the contact is still engaged with the first agent, which gives the second agent time to go through the snippets before the call is transferred to the second agent. On the other hand, the contact may be routed to an IVR or put on hold while the second agent accesses the ordered snippets.

At 216, the call is connected to a device associated with the second agent. At this point, the second agent should be familiar with the call and what led to the call being transferred to the second agent. As such, the contact does not need to reiterate the portion of the call with the first agent to the second agent. The process 200 may then loop back to 204 to identify and order snippets just in case the call is transferred to a third agent.

Figure 3:
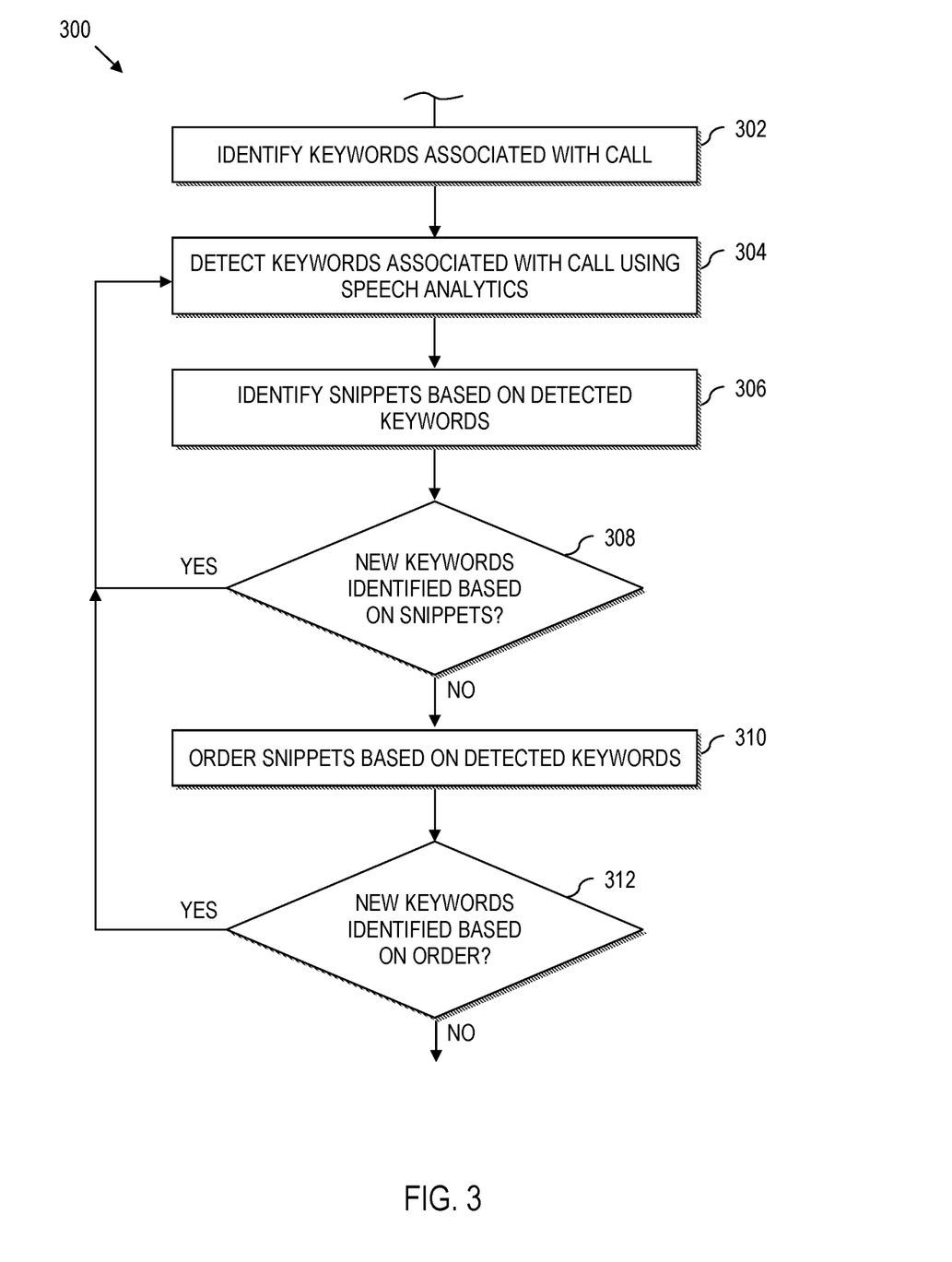
FIG. 3 is a flow chart illustrating a method for adaptively identifying snippets for presenting, according to various aspects of the present disclosure.

Turning now to FIG. 3, a process for identifying keywords is shown. At 302, the keywords are identified and put into a list of keywords similarly to box 204 of the process 200 of FIG. 2. At 304, speech analytics (and possibly emotion analytics and gesture analytics) detect the keywords in the call, similarly to box 206 of the process 200 of FIG. 2. At 306, snippets are identified based on the keywords, similarly to box 208 of the process 200 of FIG. 2.

Identifying keywords for the list of keywords may occur throughout the call. For example, if a word is found within the snippets multiple times, then that word may be identified as a keyword to add to the list. For example, if a keyword (e.g., "sedan") is detected from an IVR response that the contact gave and eighty percent of the times the contact says "sedan" the contact says "bumper of my sedan", then "bumper" may be added to the list of keywords. As another example, if an emotion detector detects that a contact is upset the last few times that the contact uses a word, then that word may be added to the list of keywords. While this process is shown at 308, this process may occur continuously. If new keywords are identified at 308, then the process 300 loops back to 304. Otherwise, at 310, the identified snippets are ordered, similarly to box 212 of process 200 of FIG. 2.

As with box 308, at 312, if new keywords are identified based on the ordering of the snippets, then those keywords are added to the list of keywords. For example, if the top three snippets all include a word that is not identified as a keyword, then that word may be added to the list of keywords. At that point, the process 300 loops back to 304. The process 300 of FIG. 3 may be used as a subprocess in any of the processes 200, 400 (FIG. 4) described herein. For example, the process 300 may be used in place of boxes 206-212 in the process 200 of FIG. 2.

Figure 4:
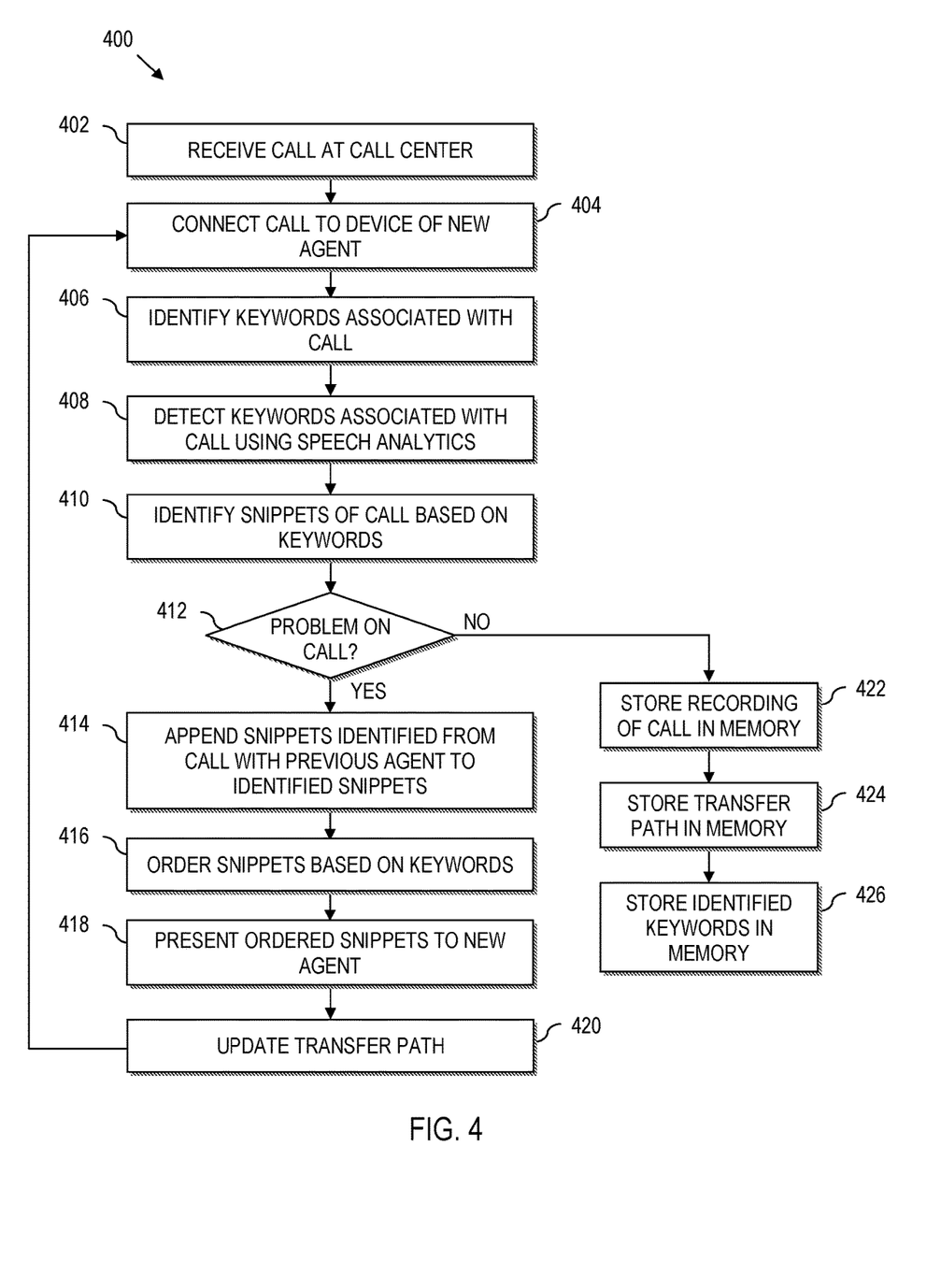
FIG. 4 is a flow chart illustrating a method for updating a subsequent agent about a call before the call is transferred to the subsequent agent, according to various aspects of the present disclosure.

Turning now to FIG. 4, a process 400 for informing a subsequent agent about a call is shown. At 402, a call is received. At 404, the call is connected to a device associated with a new agent. If no agent is associated with the call (i.e., if the call has not yet been connected to a device of an agent), then the call is connected to a device of a second agent. Boxes 406-410 operate similarly to the boxes 206-210 of FIG. 2, as described above.

At 412, there is a determination of whether the call is to be transferred because of a problem with the call. For example, if the current agent determines that the call should be transferred to another agent because the current agent is confused, then the current agent may send an indication to transfer the call.

If an indication is received, then the process continues to 414, where any snippets identified are appended to snippets from the call when the call was with a previous agent. For example, if the current agent is the second agent that handled the call, then any snippets found associated with the second agent are appended to the snippets found associated with the first agent. Thus, if there were seven snippets identified during a portion of the call with the first agent and five snippets identified with a portion of the call with the second agent, then there are twelve snippets identified overall.

At 416, the snippets are ordered, similarly to box 212 of FIG. 2. Note that all of the snippets are ordered regardless of who was the agent at the time the snippet was identified (unless there is a weighting for the most recent agent). Thus, in the example above where twelve snippets were identified (seven associated with a first agent and five with a second agent), all twelve snippets are ordered, not just the five most recently identified.

At 418, the ordered snippets are presented to a new agent, similarly to box 214 of FIG. 2. For example, if the second agent needs to transfer the call to a third agent, then the ordered snippets from both the first and second agents are presented to the third agent.

At 420, a call transfer path is updated. The call transfer path indicates the agents who have handled the call and may include metadata such as timestamps of when each agent handled a portion of the call. For example, if three agents handled the call sequentially, then the call transfer path would include: the first agent, the second agent, and the third agent.

If at 412 it is determined that there is no further transfer of the call, then at 422 a recording of the call is stored in memory. At 424, the transfer path is stored in memory, and at 426, the list of keywords associated with the call is stored in memory.

Figure 5:
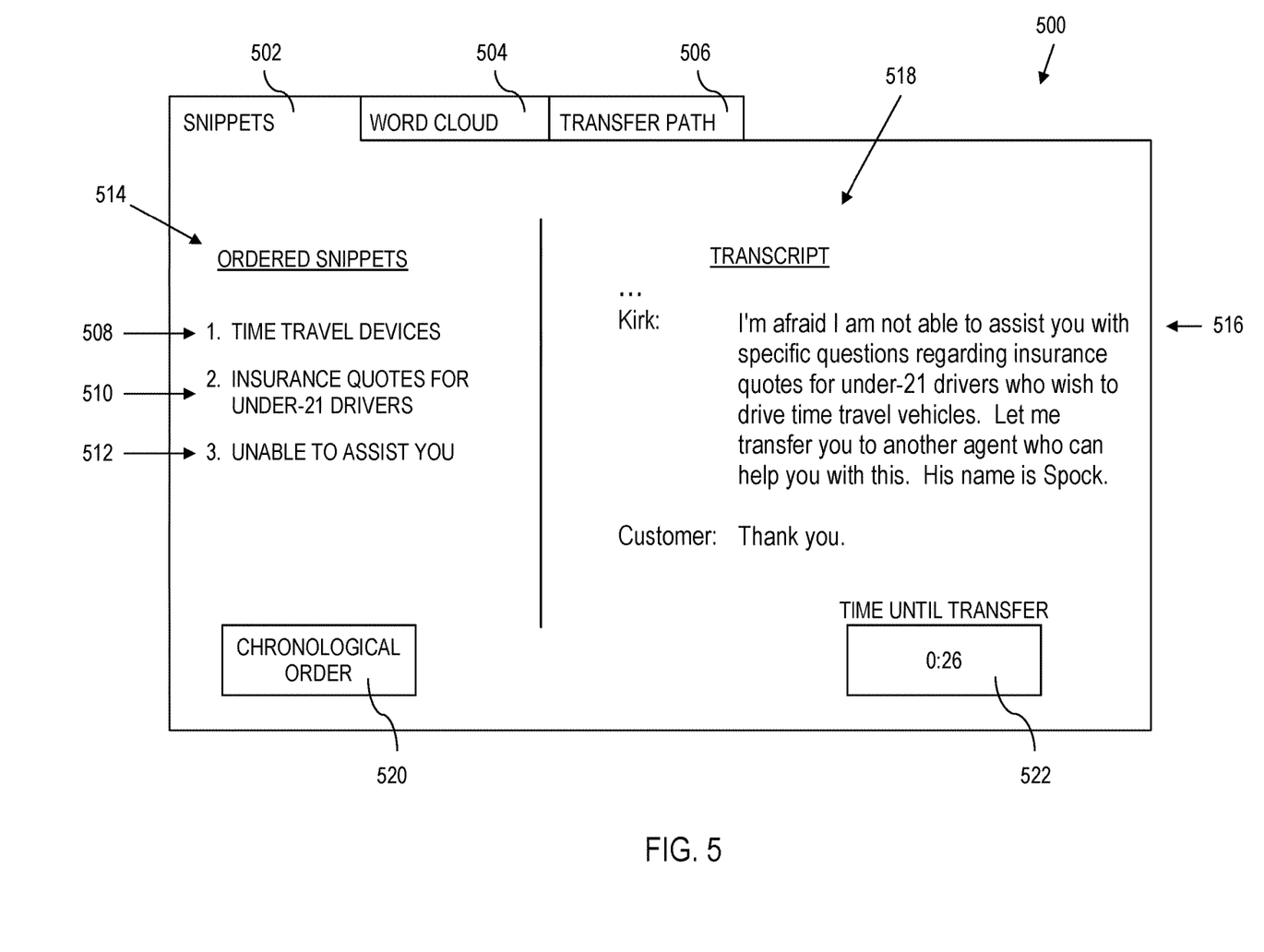
FIG. 5 is an illustration showing ordered snippets for an example of a method for updating a second agent about a call in a contact center, according to various aspects of the present disclosure.

Referring now to FIG. 5, an example GUI screen 500 for presenting the ordered snippets to an agent is shown. The snippets ordered and presented are identified using any of the processes 200, 300, 400 or combinations thereof described herein. There are several tabs 502, 504, 506 at a top of the GUI screen 500, where the SNIPPETS tab 502 is selected. As shown, there are three tabs 502, 504, 506, but there may be any number (including zero) of tabs at the top of the GUI screen 500.

With the SNIPPETS tab 502 selected, the GUI screen 500 shows the ordered snippets 508, 510, 512 on an ORDERED SNIPPETS portion 514 of the GUI screen 500. A portion of a transcript 516 of the call is available in a TRANSCRIPT portion 518 of the GUI screen 500. When an agent selects a snippet, the TRANSCRIPT portion 518 shows a transcript 516 of the call around the snippet, and the snippet itself is marked (e.g., highlighted, underlined, etc.). Further, the snippet will be played to the agent making the selection. In some embodiments, the agent does not need to select a snippet; the snippets just start playing at the first snippet 508 of the ordered snippets. The snippets may be played using the contact's and agent's voices directly, may be played back using a text-to-speech off of a transcript, or may be played back via a speech replay server for rendering synthesized speech.

The GUI screen 500 may include a button 520 that reorders the ordered snippets in a different manner than the ordering of the processes 200, 300, 400 described herein. As shown, the button 520 will reorder the snippets chronologically. Examples of other buttons that may be used include: ordering by length of the snippet, ordering by agent associated with the snippet, emotion, important keywords, transfer rationale, etc. Further, there may be more than one button that reorders the snippets. Alternatively, the ordering may stay the same, but the snippets may be played back in a different order. For example, the snippets may be played back chronologically, but the ordering in the SNIPPETS section 514 stays the same.

Further, a clock 522 may give the agent a countdown to when the call will be transferred to the agent. Thus, the clock 522 indicates how much time is left before the call will be transferred to the second agent. During this time, the call may remain with the current agent, be placed on hold, be placed in an IVR, etc.

When the WORD CLOUD tab 504 is selected, the ordered snippets are presented to the user as a word cloud. The TRANSFER PATH tab 506 displays the transfer path of the call thus far.

The following non-limiting example shown an example customer making a call to a contact center that uses the processes 200, 300, 400 above. Portions of the processes 200, 300, 400 are given in parentheses, where 2xx is from FIG. 2, 3xx is from FIG. 3, and 4xx is from FIG. 4. The contact center receives the call (202, 402) and connects the customer with an interactive voice responder (IVR), where the customer indicates that the call is about insurance for a time-travel vehicle. As such, initial keywords for the call are "insurance" and "time-travel vehicle" (206, 302, 406). The customer is connected to a device of a first agent (204, 404), and the first agent tries to assist the customer. During the call, a speech analyzer (e.g., real-time speech analyzer 182 of FIG. 1) identifies a few snippets based on the keywords (208, 210, 304, 306, 408, 410).

The snippets are analyzed, and it is determined that the customer indicates in a few of the snippets that the primary driver of the time-travel vehicle will be under twenty-one years. As such, "under twenty-one" is added to the keywords (308), and the speech analyzer detects the keywords to identify any new snippets (208, 210, 304, 306, 408, 410), which there is one.

After a while, the first agent determines that insurance for someone under twenty-one years is outside of his realm of knowledge, so he decides to transfer the call to a second agent (412). Because this is the first transfer, there is no need to append the snippets to an already existing list of snippets (414), so the snippets are ordered (212, 416) based on an algorithm where more weight is placed on the snippets that are closer in time to the decision to transfer the call. No new keywords are identified based on the ordering (312), so the ordered snippets are presented to the second agent (214, 418).

The presentation of the snippets is similar to the GUI screen of FIG. 5, and the snippets start to play automatically for the second agent. After listening to the snippets, the second agent wants to hear the second snippet again, so the second agent clicks on the second snippet, which starts playing the second snippet. After a few seconds, the second agent has been updated on what happened before she receives the call. The call is transferred to the second agent (216, 404), and the transfer path is updated (420).

The second agent is able to answer all of the customer's concerns, so there is no problem on the call (412), so a recording of the call, the identified keywords, and the transfer path are all stored in a memory for later retrieval if desired (422, 424, 426).

As such, the second agent was able to understand what the call was about without the customer having to repeat himself. The second agent further gains better access to what exactly was happening, because the second agent can hear the tone, emotion, impatience, etc. of the customer, agent, or both. Further, the audio playback of snippets is probably easier to digest in a short period of time over a transcript alone.

Figure 6:
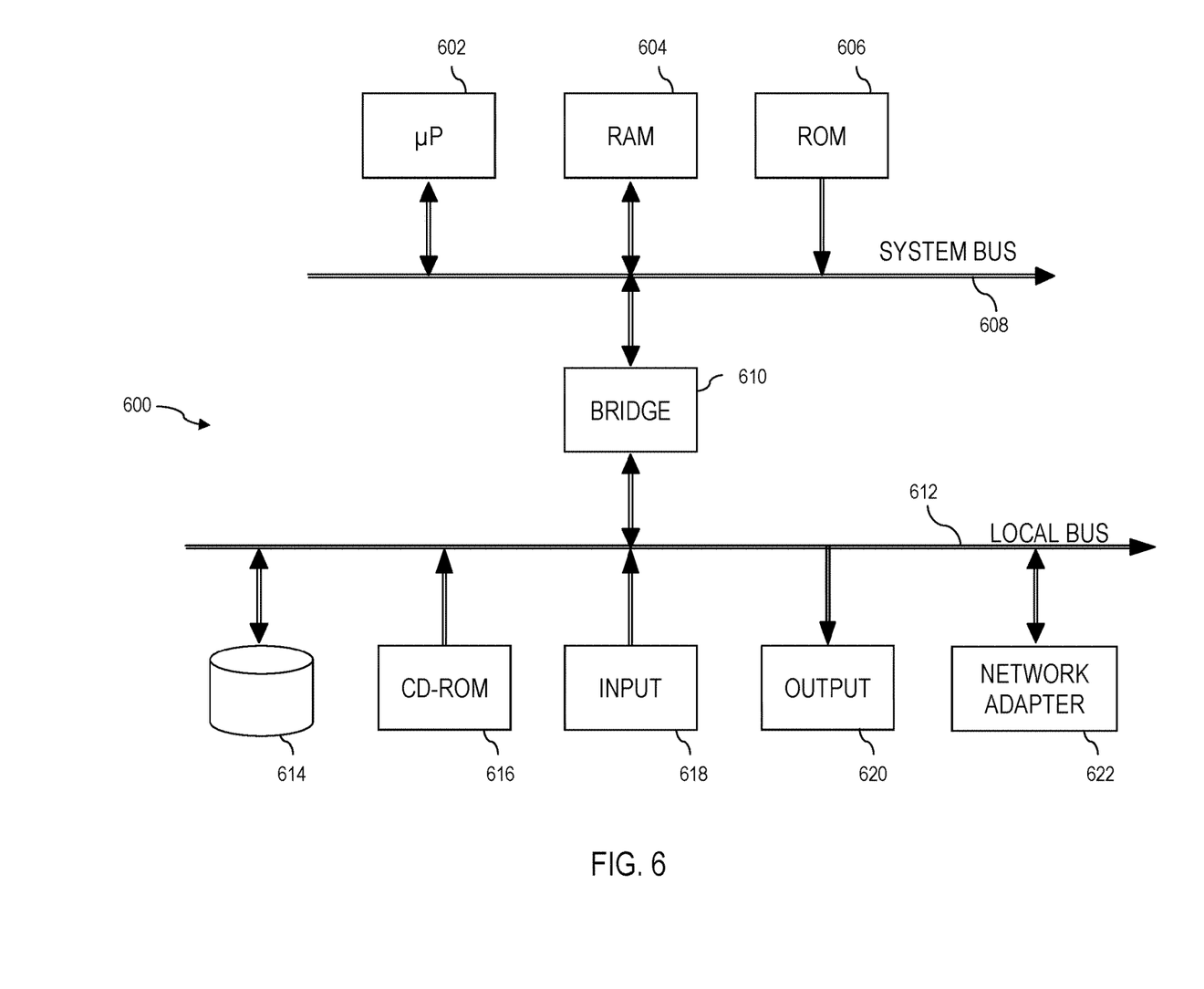
FIG. 6 is a block diagram of a computer system having a computer readable storage medium for implementing functions according to various aspects of the present invention as described in greater detail herein.

Referring to FIG. 6, a block diagram of a data processing system is depicted in accordance with the present invention. Data processing system 600 may comprise a symmetric multiprocessor (SMP) system or other configuration including a plurality of processors 610 connected to system bus 620. Alternatively, a single processor 610 may be employed. Also connected to system bus 620 is local memory 630. An I/O bus bridge 640 is connected to the system bus 620 and provides an interface to an I/O bus 650. The I/O bus may be utilized to support one or more buses and corresponding devices 670, such as storage 660, removable media storage 670, input output devices (I/O devices) 680, network adapters 690, etc. Network adapters may also be coupled to the system to enable the data processing system to become coupled to other data processing systems or remote printers or storage devices through intervening private or public networks.

Also connected to the I/O bus may be devices such as a graphics adapter, storage and a computer usable storage medium having computer usable program code embodied thereon. The computer usable program code may be executed to implement any aspect of the present invention, for example, to implement any aspect of any of the methods and/or system components illustrated in FIGS. 1-5.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using a Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A process for updating a second agent about a call in a contact center, the process comprising:
   receiving, at a contact center, a call;
   connecting the call to a device associated with a first agent of the contact center;
   configuring, using a processor, keywords to detect in the call;
   detecting, using the processor, the keywords associated with the call using speech analytics on the call;
   identifying, using the processor, snippets of the call based on the detected keywords;
   presenting the snippets to the second agent; and
   connecting the call to a device associated with the second agent.

2. The process of claim 1, wherein:
   connecting the call to a device associated with a first agent of the contact center comprises:
      receiving an indication of skills required by an agent to handle the call; and
      connecting the call to a device associated with an agent of the contact center who includes at least a subset of the skills required by an agent to handle the call; and
   configuring, using a processor, keywords to detect in the call comprises identifying keywords associated with the skills required by an agent to handle the call.

3. The process of claim 1, wherein detecting, using the processor, the keywords associated with the call using speech analytics on the call comprises detecting the keywords associated with the call using real-time speech analytics.

4. The process of claim 1, wherein identifying snippets comprises identifying the snippets of the call based on words from the call that are related to:
   an indication that the call should be transferred to the second agent; or
   an indication that the first agent is not adequately meeting the needs of the customer associated with the call.

5. The process of claim 1, wherein:
   receiving, at a contact center, a call comprises receiving, at the contact center, a video call;
   configuring, using a processor, keywords to detect in the call comprises adding gestures as keywords to a list of keywords; and
   detecting, using the processor, the keywords associated with the call using speech analytics on the call further comprises detecting the gestures added to the list of keywords using video analytics.

6. The process of claim 1, wherein identifying snippets comprises identifying the snippets of the call based on words from the call that are related to a skill required by an agent to handle the call.

7. The process of claim 1, wherein identifying snippets comprises identifying the snippets of the call based on words from the call that are related to an indication that a customer associated with the call is upset.

8. The process of claim 1, wherein identifying snippets comprises identifying the snippets of the call based on words from the call that are related to an indication that the first agent is confused.

9. The process of claim 1, wherein configuring, using a processor, keywords to detect in the call comprises configuring a static portion of a list of keywords.

10. The process of claim 9, wherein configuring, using a processor, keywords to detect in the call further comprises configuring a dynamic portion of the list of keywords that are associated with a specific section of the call center.

11. The process of claim 1, wherein identifying, using the processor, snippets of the call based on the detected keywords comprises determining a snippet as a set number of words before the keyword is detected.

12. The process of claim 1, wherein identifying, using the processor, snippets of the call based on the detected keywords comprises determining a snippet as a set number of words after the keyword is detected.

13. The process of claim 1, wherein identifying, using the processor, snippets of the call based on the detected keywords comprises determining a snippet as a set number of words before the keyword is detected and a set number of words after the keyword is detected.

14. The process of claim 1, wherein identifying, using the processor, snippets of the call based on the detected keywords comprises determining a snippet as a sentence that includes at least one of the keywords.

15. The process of claim 1, wherein identifying, using the processor, snippets of the call based on the detected keywords comprises determining a snippet as words that fall into a time window before the keyword is detected.

16. The process of claim 1, wherein identifying, using the processor, snippets of the call based on the detected keywords comprises determining a snippet as words that fall into a time window after the keyword is detected.

17. The process of claim 1, wherein identifying, using the processor, snippets of the call based on the detected keywords comprises determining a snippet as words that fall into a time window before the keyword is detected and a set time window after the keyword is detected.

18. A system comprising a processor coupled to memory, wherein the processor is programmed to perform:
   connecting a call to a device associated with a first agent of a contact center;
   configuring, using the processor, keywords to detect in the call;
   detecting, using the processor, the keywords associated with the call using speech analytics on the call;
   identifying, using the processor, snippets of the call based on the detected keywords;
   presenting the snippets to a second agent; and
   connecting the call to a device associated with the second agent.

19. The system of claim 18, wherein:
connecting the call to a device associated with a first agent of the contact center comprises:
   receiving an indication of skills required by an agent to handle the call; and
   connecting the call to a device associated with an agent of the contact center who includes at least a subset of the skills required by an agent to handle the call; and
configuring, using a processor, keywords to detect in the call comprises identifying keywords associated with the skills required by an agent to handle the call.

20. The system of claim 18, wherein presenting the snippets to the second agent comprises presenting the snippets to the second agent via a graphical user interface and playing the snippets for the second agent.

* * * * *